(12) United States Patent
Hazlewood et al.

(10) Patent No.: US 8,230,455 B2
(45) Date of Patent: Jul. 24, 2012

(54) METHOD AND SYSTEM FOR ENFORCING PASSWORD POLICY FOR AN EXTERNAL BIND OPERATION IN A DISTRIBUTED DIRECTORY

(75) Inventors: Kristin Marie Hazlewood, Austin, TX (US); Daw Feng, Austin, TX (US); Gary Dale Williams, Driftwood, TX (US)

(73) Assignee: International Business Machines Corporation, Armonk, NY (US)

( * ) Notice: Subject to any disclaimer, the term of this patent is extended or adjusted under 35 U.S.C. 154(b) by 1277 days.

(21) Appl. No.: 11/776,292

(22) Filed: Jul. 11, 2007

(65) Prior Publication Data
US 2009/0019533 A1    Jan. 15, 2009

(51) Int. Cl.
*H04L 29/06* (2006.01)
(52) U.S. Cl. ................... 725/5; 713/183; 726/4
(58) Field of Classification Search ............ 713/183; 726/4
See application file for complete search history.

(56) References Cited

U.S. PATENT DOCUMENTS

| | | | |
|---|---|---|---|
| 6,665,674 B1 * | 12/2003 | Buchanan et al. ............. | 1/1 |
| 6,708,170 B1 * | 3/2004 | Byrne et al. ................. | 1/1 |
| 7,165,182 B2 * | 1/2007 | Excoffier et al. ............ | 713/183 |
| 7,278,021 B2 * | 10/2007 | Shigeeda ..................... | 713/182 |
| 7,571,180 B2 * | 8/2009 | Minyailov ................... | 1/1 |
| 7,707,623 B2 * | 4/2010 | Cicchitto et al. ............ | 726/4 |
| 7,774,428 B2 * | 8/2010 | Yu ............................... | 709/218 |
| 2002/0078386 A1 | 6/2002 | Bones et al. | |
| 2004/0250141 A1 | 12/2004 | Casco-Arias | |
| 2005/0114673 A1 | 5/2005 | Raikar et al. | |
| 2005/0216485 A1 | 9/2005 | Bell et al. | |
| 2006/0168255 A1 * | 7/2006 | Katz et al. .................... | 709/229 |
| 2006/0235850 A1 | 10/2006 | Hazlewood et al. | |
| 2006/0248117 A1 | 11/2006 | Bell et al. | |
| 2006/0259960 A1 | 11/2006 | Kondo | |

\* cited by examiner

*Primary Examiner* — Vivek Srivastava
*Assistant Examiner* — Michael D Anderson
(74) *Attorney, Agent, or Firm* — Jeffrey S. LaBaw; David H. Judson

(57) ABSTRACT

The invention describes techniques for enforcing password policy within a distributed directory environment that includes one or more distributed directory servers and a proxy server that acts as an intermediate agent between a client and the distributed directory environment. In one aspect, the proxy server is enhanced to support the passing (from the backend server to the client) of password policy controls. In particular, controls returned from a backend server are parsed and cached (for re-use) for the life of a given client connection. According to another aspect, the proxy server ensures that all compare operations for a single user's password are directed to the same backend server in the distributed directory environment. This insures that a user's most current password is used, and that failed operation counts, resets and operational attributes are up-to-date. According to still another aspect, the proxy server enforces password policy on bind plug-ins and, in particular, through a pair of pre-bind and post-bind extended operations. In particular, pre-bind processing includes checking if an account is locked. Post-bind processing includes checking for expired passwords, grace logins and updating failed/successful bind counters.

29 Claims, 10 Drawing Sheets

FIG. 5

500 {
Password Policy Request Control

Control name: 1.3.6.1.4.1.42.2.27.8.5.1
Control criticality: FALSE
Control value: None 502 {
Password Policy Response Control Control name: 1.3.6.1.4.1.42.2.27.8.5.1 (same as the request control)
Control criticality: FALSE
Control value: A BER encoded value defined in ASN.1 as follows:
    PasswordPolicyResponseValue : := SEQUENCE {
    warning    [0] CHOICE OPTIONAL {
        timeBeforeExpiration    [0] INTEGER (0 .. MaxInt),
        graceLoginsRemaining    [1] INTEGER (0 .. maxInt) }
    error    [1] ENUMERATED OPTIONAL {
        passwordExpired    (0),
        accountLocked    (1),
        changeAfterReset    (2),
        passswordModNotAllowed    (3),
        mustSupplyOldPassword    (4),
        invalidPasswordSyntax    (5),
        passwordTooShort    (6),
        passwordTooYoung    (7),
        passwordInHistory    (8) } }

| PASSWORD POLICY RULES | ORDER OF SELECTION |
|---|---|
| pwdMinLength > pwdMinOthersChars + passwordAlphaChars<br>pwdMinLength > pwdMinDiffChars | pwdMinLength,<br>passwordAlphaChars,<br>passwordMinOtherChars,<br>pwdMinDiffChars |
| pwdMaxAge > pwdMinAge<br>pwdMaxAge > pwdExpireWarning | pwdMaxAge,<br>pwdMinAge,<br>pwdExpireWarning |
| pwdAllowUserChange has to be TRUE; if pwdMustChange is TRUE | pwdAllowUserChange<br>pwdMustChange |

FIG. 8

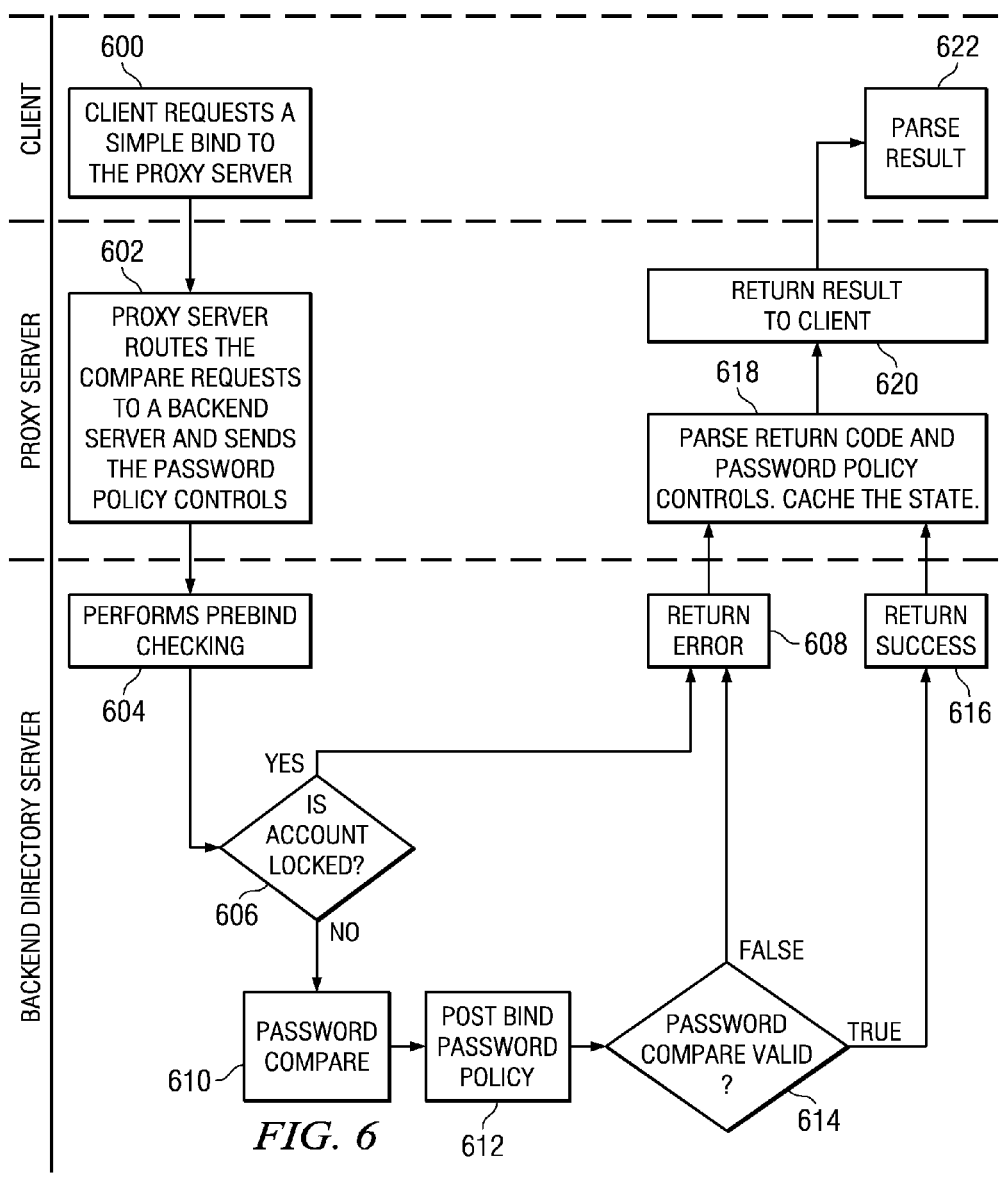

| PWD POLICY ATTRIBUTE | MORE RESTRICTED VALUE | VALID VALUES | DEFAULT VALUE |
|---|---|---|---|
| pwdAttribute | N/A | userPassword | userPassword |
| pwdMinAge | Greater | Greater than or equal (GE) TO 0 | 0- no age limit |
| pwdMaxAge | Less | GE 0 | 0- password does not expire |
| pwdInHistory | Greater | 0 TO 10 | 0- no password history |
| pwdCheckSyntax | Greater | 0,1,2<br>1 - if server not able to check the syntax, then accept password<br>2- if server is not able to check syntax, then reject the password | 0 |
| pwdMinLength | Greater | GE 0 | 0- no minimum length |
| pwdExpireWarning | Greater | GE 0 | 0- no warnings will be sent |
| pwdGraceLoginLimit | Less | GE 0 | 0- no grace login |
| pwdLockout | True | True/False | False |
| pwdLockoutDuration | Greater | GE 0 | 0- locked out until reset |
| pwdMaxFailure | Less | GE 0 | 0 - no failure count, no lock out |
| pwdFailureCountInterval | Greater | GE 0 | 0 - no count, reset by successfully authentication |
| pwdMustChange | True | True/False | True/False if cn=noPwdPolicy |
| pwdAllowUserChange | True | True/False | True |
| pwdSafeMode | True | True/False | False |
| -pwdPolicy | True | True/False | False |
| passwordMinAlphaChars | Greater | GE 0 | 0- no min alpha will be enforced |
| passwordMinOtherChars | Greater | GE 0 | 0 - no min other char |
| passwordMaxRepeatedChars | Less | GE 0 | 0 - no max repeated char |
| passwordMinDiffChars | Greater | GE 0 | 0 - no diff char |
| -pwdPolicyStartTime | Less | GE 0 | Entry createTimeStamp |

*FIG. 9*

| GROUP X PWD POLICY | GROUP Y PWD POLICY | GROUP Z PWD POLICY | COMPOSITE GROUP PWD POLICY |
|---|---|---|---|
| pwdMaxAge = 86400<br>pwdSafeMode = True<br><br>pwdMaxFailure = 5<br>-pwdPolicy = True<br>-pwdPolicyStarttime=<br>20060406200000 | pwdMaxAge = 43200<br>pwdSafeMode = False<br><br>-pwdPolicy = True<br>-pwdPolicyStarttime=<br>20060306200000 | pwdCheckSytax = 1<br><br>-pwdPolicy = True<br>-pwdPolicyStarttime=<br>20060506200000 | pwdMaxAge = 43200<br>pwdSafeMode = True<br>pwdCheckSytax = 1<br>pwdMaxFailure = 5<br>-pwdPolicy = True<br>-pwdPolicyStarttime=<br>20060306200000 |
| pwdMaxAge = 86400<br>-pwdPolicy = True | pwdMaxAge = 43200<br>pwdSafeMode = True | pwdMaxAge = 0<br>-pwdPolicy = True | pwdMaxAge = 86400<br>pwdSafeMode = False<br>-pwdPolicy = True<br>(note: group Y's pwd policy is not used in calculating composite group policy, since its -pwdPolicy is not defined and is default to FALSE. |
| pwdMinLength = 10<br>passwordMinOtherChars = 4<br>passwordMinAlphaChars = 6<br>-pwdPolicy = True | pwdMinLength = 12<br>-pwdPolicy = True | | pwdMinLength = 12<br>-pwdPolicy = True |
| pwdMinLength = 10<br>passwordMinOtherChars = 4<br>passwordMinAlphaChars = 6<br>-pwdPolicy = True | | pwdMinLength = 10<br>passwordMinOtherChars = 5<br>passwordMinAlphaChars = 3<br>-pwdPolicy = True | pwdMinLength = 10<br>passwordMinOtherChars = 5<br>passwordMinAlphaChars = 3<br>-pwdPolicy = True |

*FIG. 10*

| INDIVIDUAL PWD POLICY | GROUP PWD POLICY | GLOBAL PWD POLICY | EFFECTIVE PWD POLICY |
|---|---|---|---|
| pwdMaxAge = 86400<br>-pwdPolicy = True<br>pwdMinAge = 21600<br><br><br><br><br><br><br><br><br><br><br><br><br><br><br>pwdLockout=True<br><br>-pwdPolicyStarttime=<br>20060406200000 | pwdMaxAge = 43200<br>-pwdPolicy = True<br><br>pwdInHistory = 5<br><br><br><br><br><br><br><br><br><br><br><br><br><br><br><br><br><br>-pwdPolicyStarttime=<br>20060306200000 | -pwdPolicy = True<br><br>pwdMinAge = 43200<br>pwdInHistory = 3<br>pwdCheckSyntax = 0<br>pwdMinLength = 0<br>pwdExpireWarning = 0<br>pwdGraceLoginLimit = 0<br>pwdLockoutDuration = 0<br>pwdMaxFailure =0<br>pwdFailureCountInterval=0<br>passwordMinAlphaChars=0<br>passwordMinOtherChars=0<br>passwordMaxRepeatedChars=0<br>passwordMinDiffChars=0<br>pwdLockout=False<br>pwdAllowUserChange=True<br>pwdMustChange=True<br>pwdSafeModify=False<br>-pwdPolicyStarttime=<br>20060506200000 | pwdMaxAge = 86400<br>-pwdPolicy = True<br><br>pwdMinAge = 21600<br>pwdInHistory = 5<br>pwdCheckSyntax = 0<br>pwdMinLength = 0<br>pwdExpireWarning = 0<br>pwdGraceLoginLimit = 0<br>pwdLockoutDuration = 0<br>pwdMaxFailure =0<br>pwdFailureCountInterval=0<br>passwordMinAlphaChars=0<br>passwordMinOtherChars=0<br>passwordMaxRepeatedChars=0<br>passwordMinDiffChars=0<br>pwdLockout=True<br>pwdAllowUserChange=True<br>pwdMustChange=True<br>pwdSafeModify=False<br>-pwdPolicyStarttime=<br>20060406200000 |
| pwdMaxAge = 86400<br>-pwdPolicy = True<br>pwdMinAge = 21600<br><br>pwdMinLength = 8<br><br><br><br><br><br><br><br><br><br><br><br><br>pwdLockout=True<br><br>-pwdPolicyStarttime=<br>20060406200000 | pwdMaxAge = 43200<br>-pwdPolicy = True<br><br>pwdInHistory = 5<br><br><br><br><br><br><br><br><br><br><br><br><br><br><br><br><br>-pwdPolicyStarttime=<br>20060306200000 | -pwdPolicy = True<br><br>pwdMinAge = 0<br>pwdInHistory = 3<br>pwdCheckSyntax = 0<br>pwdMinLength = 10<br>pwdExpireWarning = 0<br>pwdGraceLoginLimit = 0<br>pwdLockoutDuration = 0<br>pwdMaxFailure =0<br>pwdFailureCountInterval=0<br>passwordMinAlphaChars=4<br>passwordMinOtherChars=4<br>passwordMaxRepeatedChars=0<br>passwordMinDiffChars=0<br>pwdLockout=False<br>pwdAllowUserChange=True<br>pwdMustChange=True<br>pwdSafeModify=False<br>-pwdPolicyStarttime=<br>20060506200000 | pwdMaxAge = 86400<br>-pwdPolicy = True<br><br>pwdMinAge = 21600<br>pwdInHistory = 5<br>pwdCheckSyntax = 0<br>pwdMinLength = 8<br>pwdExpireWarning = 0<br>pwdGraceLoginLimit = 0<br>pwdLockoutDuration = 0<br>pwdMaxFailure =0<br>pwdFailureCountInterval=0<br>passwordMinAlphaChars=0<br>passwordMinOtherChars=0<br>passwordMaxRepeatedChars=0<br>passwordMinDiffChars=0<br>pwdLockout=True<br>pwdAllowUserChange=True<br>pwdMustChange=True<br>pwdSafeModify=False<br>-pwdPolicyStarttime=<br>20060406200000 |

*FIG. 11*

METHOD AND SYSTEM FOR ENFORCING PASSWORD POLICY FOR AN EXTERNAL BIND OPERATION IN A DISTRIBUTED DIRECTORY

CROSS-REFERENCE TO RELATED APPLICATION

This application is related to Ser. No. 11/776,332, filed Jul. 11, 2007, titled "Method and system for enforcing password policy in a distributed directory."

BACKGROUND OF THE INVENTION

1. Technical Field

The present invention relates to enforcing password policy in a distributed directory environment.

2. Background of the Related Art

A directory is a special type of database for managing information about people, organizations, data processing systems, and other information sources. Information within a directory is organized within a hierarchical namespace. Each entry is a named object and consists of a set of attributes. Each attribute has a defined attribute type and one or more values. Each entry is identified by an unambiguous distinguished name (DN), wherein a distinguished name is a concatenation of selected attributes from an entry. A directory service provides a mechanism for searching a directory and for retrieving information from a directory. Various standards have been promulgated for defining directories and directory services. For example, the X.500 specifications define a directory standard; more information can be found in Weider et al., "Technical Overview of Directory Services Using the X.500 Protocol", Internet Engineering Task Force (IETF) RFC 1309, March 1992. As another example, the Lightweight Directory Access Protocol (LDAP) specifications define a protocol for accessing a directory that supports the X.500 directory model; more information can be found in Wahl et al., "Lightweight Directory Access Protocol (v3)," IETF RFC 2251, December 1997.

A logical representation of a directory does not necessarily reflect an organization of the physical storage of the directory. In a manner similar to many types of memory systems, a directory may be logically supported as a cohesive whole yet physically supported in a distributed manner. For example, a single "distributed" directory may be stored across many servers, wherein each server supports a subtree of the directory. In particular, a known distributed directory environment includes one or more LDAP "backend" servers and a proxy server that acts as an intermediate agent between a client and the distributed directory environment. Clients bind to the proxy server instead of directly binding to the backend LDAP servers.

A set of rules that controls how passwords are used and administered in this type of directory environment is known as a "password policy." These rules enforce various security requirements, e.g., that a user change his or her password periodically, that the user's selected password meets certain requirements for construction, that re-use of an old password is prevented, that entities are locked out after a certain number of failed attempts to use a given password, and so on. A "user" refers to any LDAP client application that has an identity in the directory. In an LDAP distributed directory environment, a given password policy is defined according to an object-oriented schema that defines a password policy object class, which includes a set of administrative password policy attributes, together with a set of operational attributes that hold general policy state information for each user. The policy also includes one or more "controls" that are used while enforcing password policy. In particular, a "request control" is defined as a control that is sent by a client with a request operation to elicit a "response control." The "response control" typically contains one or more warnings and errors associated with password policy. Further details of how to implement password policy in this manner is described in Behera et al., "Password Policy for LDAP Directories" Internet Draft RFC, October 2001.

BRIEF SUMMARY OF THE INVENTION

A method, system, apparatus, or computer program product is presented for enforcing password policy within a distributed directory environment that includes one or more distributed directory servers and a proxy server that acts as an intermediate agent between a client and the distributed directory environment.

According to one aspect, the proxy server is enhanced to support the passing (typically from the backend server to the client) of password policy controls, which are controls that supply information to a user about policy errors and warnings. In this aspect, the proxy server accepts a password policy request control, preferably on all operations. When a request control is received as a result of an error case, the proxy server sends a corresponding response control containing the errors that a backend server provides; if a client does not send a password policy request control, the proxy server provides "extended" error information. This aspect of the invention ensures that password policy controls returned from a backend server are parsed and cached (for policy enforcement) for the life of a given client connection. Thus, the proxy server parses the control and, if there are any warnings that apply, that state is stored on the connection.

According to another aspect, the proxy server ensures that all compare operations for a single user's password are directed to the same backend server in the distributed directory environment. This insures that a user's most current password is used, and that failed operation counts, resets and operational attributes are up-to-date.

According to still another aspect, the proxy server enforces password policy on bind plug-ins and, in particular, through a pair of pre-bind and post-bind extended operations. In particular, pre-bind processing includes checking if an account is locked. Post-bind processing includes checking for expired passwords, grace logins and updating failed/successful bind counters.

The proxy server uses the password policy control preferably on all operations to detect and enforce warning information. The pre- and post-bind password policy extended operations provide a remote mechanism to force the proxy server to perform pre- and post-bind password policy validations and updates.

The above features enforce password policy across the distributed directory environment. The password policy is local to each backend directory server; thus, the policy that applies to a single user is on the same system where the user's entry (in the distributed directory) resides.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof reference is now made to the following descriptions taken in conjunction with the accompanying drawings, in which:

FIG. 5 illustrates a request control and its associated response control;

FIG. 6 is a process flow illustrating a simple bind case according to the present invention;

FIG. 8 is a table illustrating representative password policy rules and their order of selection for evaluating a user's group password policy;

FIG. 9 is a table describing how restrictive attribute values are determined in one embodiment;

FIG. 10 is a table showing examples of how a user's group password policy is determined in one embodiment; and FIG. 11 is a table showing examples of how effective password policies are determined.

DETAILED DESCRIPTION OF AN ILLUSTRATIVE EMBODIMENT

In general, the devices that may comprise or relate to the present invention include a wide variety of data processing technology. Therefore, as background, a typical organization of hardware and software components within a distributed data processing system is described prior to describing the present invention in more detail.

Figure 1A:
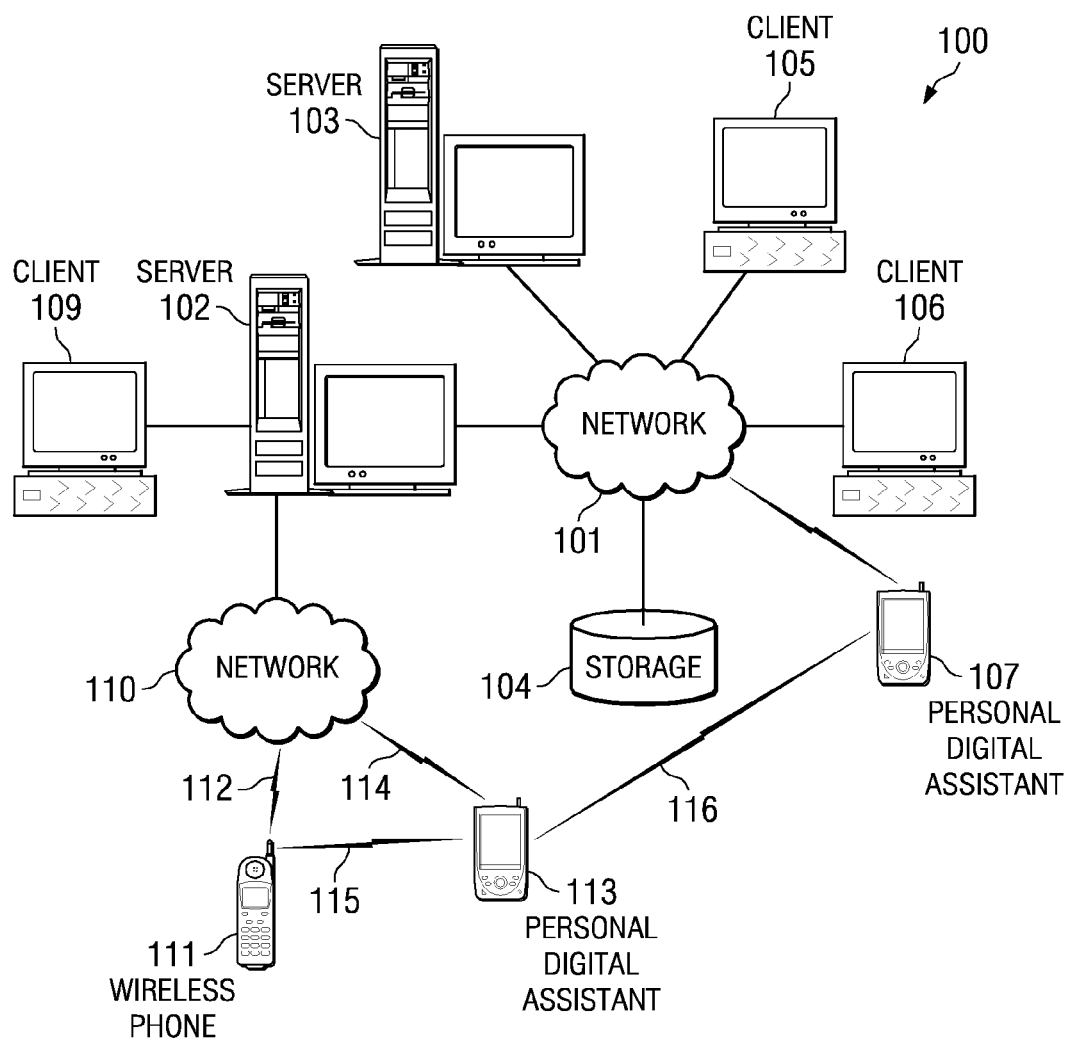
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), and the like. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), and so on. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
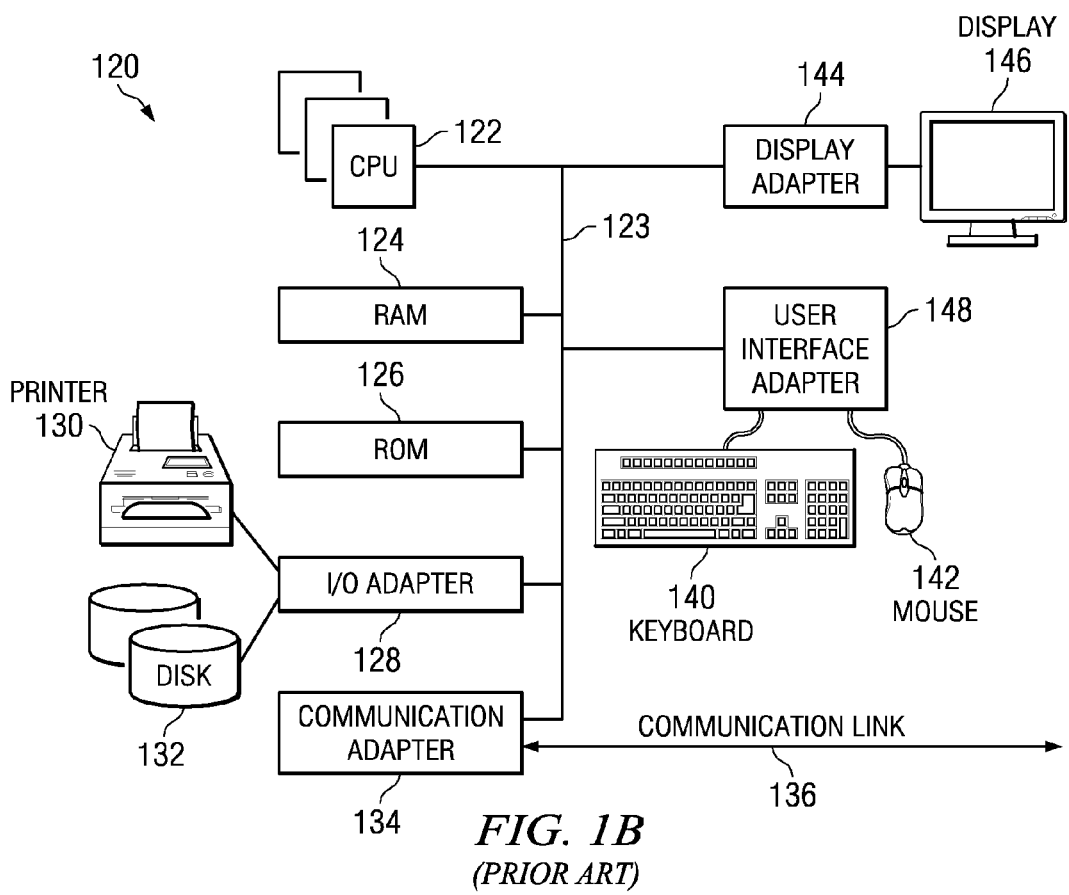
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, and the like. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a UNIX operating system, while another device contains a simple Java runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to an improved distributed data processing environment. Prior to describing the present invention in more detail, some aspects of typical distributed data processing environments are described.

The descriptions of the figures herein may involve certain actions by either a client device or a user of the client device. One of ordinary skill in the art would understand that responses and/or requests to/from the client are sometimes initiated by a user and at other times are initiated automatically by a client, often on behalf of a user of the client. Thus, when a client or a user of a client is mentioned in the description of the figures, it should be understood that the terms "client" and "user" can be used interchangeably without significantly affecting the meaning of the described processes.

Certain computational tasks may be described below as being performed by functional units. A functional unit may be represented by a routine, a subroutine, a process, a subprocess, a procedure, a function, a method, an object-oriented object, a software module, an applet, a plug-in, an Active control, a script, or some other component of firmware or software for performing a computational task.

The descriptions of the figures herein may involve an exchange of information between various components, and the exchange of information may be described as being implemented via an exchange of messages, e.g., a request message followed by a response message. It should be noted that an exchange of information between computational components, which may include a synchronous or asynchronous request/response exchange, may be implemented equivalently via a variety of data exchange mechanisms, such as messages, method calls, remote procedure calls, event signaling, or other mechanism.

The present invention is described below with respect to terminology and functionality as associated with X.500 directories and Lightweight Directory Access Protocol (LDAP) operations, but it should be noted that the present invention may be implemented using a variety of directory implementation schemes and protocols.

Figure 1C:
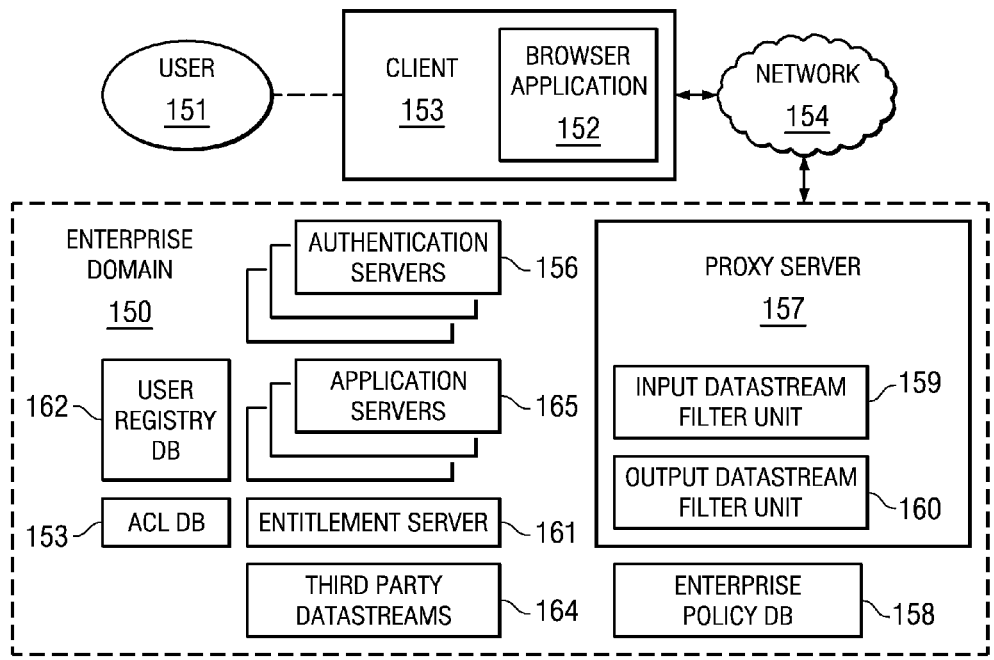
FIG. 1C depicts a block diagram that shows a typical distributed data processing system for an enterprise domain.

With reference now to FIG. 1C, a block diagram depicts a typical distributed data processing system for an enterprise domain. As in a typical corporate computing environment or an Internet-based computing environment, enterprise domain 150 hosts controlled resources that user 151 can access, e.g., by using browser application 152 on client device 153 through network 154.

Enterprise domain 150 supports multiple servers. Application servers 155 support accessible resources through web-based applications or other types of applications, including legacy applications. Authentication servers 156 support various authentication mechanisms, such as username/password, X.509 certificates, secure tokens, or an SSL session.

Proxy server 157 performs a wide range of functions for enterprise domain 150. Proxy server 157 can be administratively configured through configuration files and enterprise policy database 158 to control the functionality of proxy server 157, e.g., caching web pages in order to mirror the content from an application server or filtering the incoming and outgoing datastreams through input datastream filter unit 159 and output datastream filter unit 160. Input datastream filter unit 159 may perform multiple checks on incoming requests while output datastream filter unit 160 may perform multiple checks on outgoing responses; each check may be performed in accordance with goals and conditions that are specified within various enterprise policies.

Enterprise domain 150 comprises entitlements server 161, which accepts information within user registry database 162, access control list (ACL) database 163, and third-party datastreams 164 from other domains. Entitlements server 161 determines whether users are authorized to access certain services that are provided by application servers 155 within domain 150 by checking policies and/or access control lists against user requests for those services. A set of user-specific entitlements is used by proxy server 157, entitlement server 161, or a combined or coordinated effort between proxy server 157 and entitlement server 161 to determine or control access to application servers 155 and other controlled resources in response to user requests.

The above-noted entities within enterprise domain 150 represent typical entities within many computing environments. Web-based applications can utilize various means to prompt users to enter authentication information, often as a username/password combination within an HTML form. In the example that is shown in FIG. 1C, user 151 may be required to be authenticated before client 153 may have access to resources, after which a session is established for client 153. In FIG. 1C, after receiving an incoming request from client 153, input datastream filter unit 159 may determine whether client 153 has already established a session; if not, an authentication service on authentication servers 156 can be invoked in order to authenticate user 151. If client 153 has already established a session, then additional checks may be performed on an incoming request prior to granting access to a controlled resource; the additional checks may be specified in an enterprise authentication policy.

Figure 2:
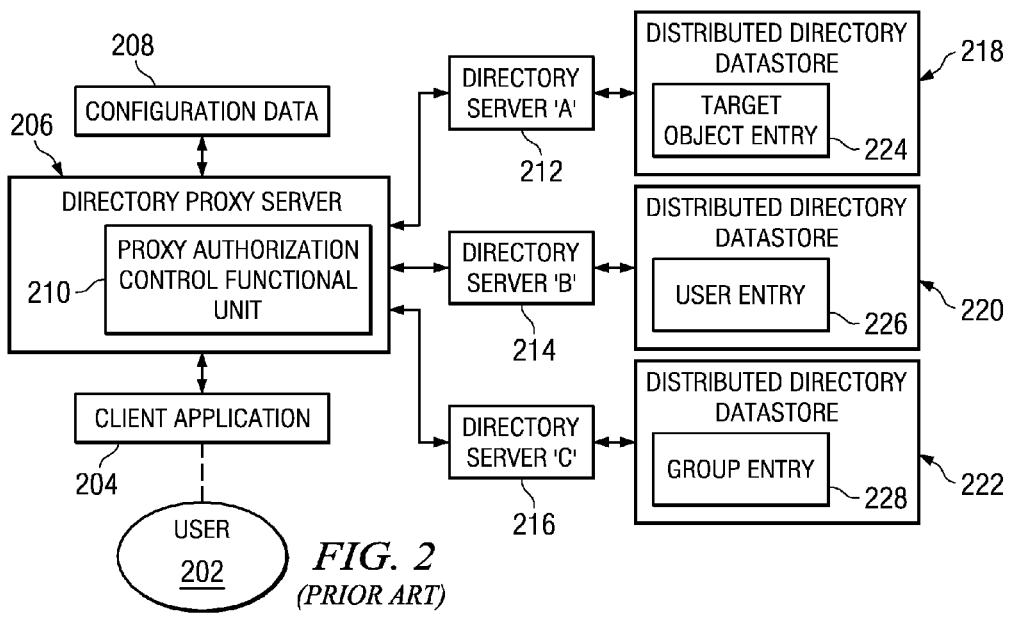
FIG. 2 depicts a block diagram that shows a typical distributed directory environment.

With reference now to FIG. 2, a block diagram depicts a typical distributed directory environment. User 202 operates client application 204, which may execute on a client device such as client 153 as shown in FIG. 1C. Client application 204 interacts with directory servers through a proxied directory server, also known as a directory proxy server or a proxy directory server, which is shown as proxy server 206; proxy server 206 may execute on the user's client device or elsewhere within a network of connected devices, such as those shown in FIG. 1A. Proxy server 206 may be associated with configuration files 208 that contain information that is managed via an administrative user application to control the functionality of proxy server 206.

Proxy server 206 acts as an intermediate agent (an "intermediary") to the distributed directory environment. Although only one proxy server is shown, there may be multiple such proxy servers or proxy server instances running on one or more physical machines. Proxy server 206 is able to perform operations in accordance with a variety of directory schemes and protocols, including LDAP specifications. Proxy server 206 contains proxy authorization control functional unit 210, which generates proxy authorization controls, also called proxied authorization controls, that are employed by proxy server 206 to perform an operation with respect to the distributed directory on behalf of client application 204, or equivalently, on behalf of user 202. As described in Wahl et al., "Lightweight Directory Access Protocol (v3)", IETF RFC 2251, December 1997, a control is a way to specify extension information for use with an LDAP operation. Controls can be sent as part of an LDAP request and apply only to the accompanying request. If the server recognizes the control type and it is appropriate for the operation, the server will make use of the control when performing the requested operation; various optional parameters can be used to inform the server whether or not to ignore the control if it is unrecognized or it is inappropriate. The control also contains an object identifier that has been assigned to the control.

Hence, proxy authorization control functional unit 210 can present an application programming interface (API) that accepts a proxy distinguished name (DN) as an input parameter; this input parameter specifies the DN of the entry of the identity that proxy server 206 is to assume when performing an operation on behalf of client application 204 or user 202. The provided API can be used by the caller to create an LDAP control containing the proxy authorization identity; the created proxy authorization control would then be included in LDAP operations to request an operation from a directory server. Using the proxy authorization control mechanism, a client, or in this case, proxy server 206, can bind to the directory engine using its own identity, but is granted proxy authorization rights of another user, i.e. user 202 or client application 204, to access the target directory. When the LDAP server receives an operation with proxy authorization control, the bind DN is validated against the administrative group and/or the predefined proxy authorization group to determine whether the bind DN should be granted the proxy authorization right. In other words, the bound application client, which is proxy server 206 in this example, must be a member of the administrative group or proxy authorization group to request a proxy authorization operation. More information about using a proxy authorization control can be found in Weltman, "LDAP Proxied Authorization Control," IETF Internet-Draft, draft-weltman-ldapv3-proxy-12.txt, April 2003. The LDAP protocol also supports an extension mechanism that allows additional operations to be defined for services that are not defined within the LDAP specification. An extended operation allows clients to make requests and receives responses with predefined syntaxes and semantics that may be specific to particular implementations.

The distributed directory environment includes multiple directory servers 212-216 that interoperate within the same distributed data processing environment as proxy server 206 and client application 204, e.g., in a manner similar to the distributed data processing environments that are shown in FIG. 1A and FIG. 1C. Directory servers 212-216 support functionality for accessing datastores that contain portions of a distributed directory, i.e. portions of a directory information tree, shown as distributed directory datastores 218-222. Directory servers 212-216 also contain functionality, which is not shown in FIG. 2, that supports the receipt and processing of proxied authorization controls, e.g., as may be sent by proxy server 206 or other directory clients. A typical directory server is a relational database management (RDBM) server.

In a manner similar to the scenario that was described further above, user entries, group entries, and target object entries that are of interest to a particular directory operation may reside in different portions of a distributed directory that are supported on different systems. In the example that is shown in FIG. 2: target object entry 224 resides within distributed directory datastore 218; user entry 226 resides within distributed directory datastore 220; and group entry 228 resides within distributed directory datastore 222. These locations are merely representative.

Figure 3:
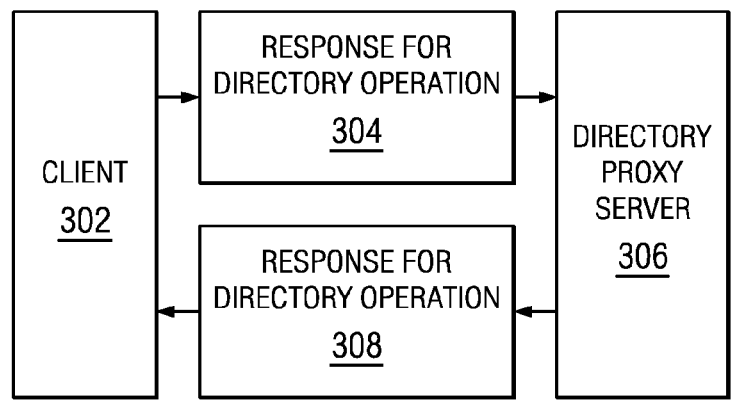
FIG. 3 depicts a block diagram that shows a typical dataflow between a client or a client application and a directory proxy server.

With reference now to FIG. 3, a block diagram depicts a typical dataflow between a client or a client application and a directory proxy server. Client 302 sends request message 304 that represents a request for a directory operation to proxy server 306. After performing the requested directory operation, proxy server 306 returns response message 308 that represents a response for the requested directory operation to client 302. Client 302 then performs some additional computation task on the information that it has received. In this manner, the exchange of a request and response with respect to a directory operation between a client and a directory proxy server is similar to a dataflow that would be found within a typical distributed directory environment. It may be assumed that proxy server 306 obtains or has previously cached a user identity and any necessary authentication credentials for performing an authentication operation (not shown) for the user or the client for which the directory operation is being performed.

In summary, a distributed directory is a directory environment in which data is partitioned across multiple directory servers. As illustrated in FIG. 3, the distributed directory typically comprises a collection of machines including relational database management (RDBM) servers holding data, and one or more proxy servers managing the topology. A representative proxy server may be an IBM® Tivoli® Directory Server that provides, among other functions, request routing, load balancing, failover, distributed authentication and support for distributed/membership groups and partitioning of containers. As described above, the directory proxy server sits at the front-end of a distributed directory and provides efficient routing of user requests thereby improving performance, and providing a unified directory view to the client. The proxy server also provides data support for groups and ACLs that are not affected by partitioning, and support for partitioning of flat namespaces.

The proxy server is configured with connection information to connect to each of the backend servers for which it is proxying. Typically, the connection information comprises of host address, port number, bind DN, credentials and a connection pool size. Each of the back-end servers is configured with the DN and credentials that the proxy server uses to connect to it. The DN must be a member of the backend server's (local) administration group or local administrator. In particular, the DN must have administrative and proxy authorization authority. The proxy server is configured with the same schema as the backend servers for which it is proxying. The proxy server also is configured with partition information, which determines how the data is distributed between the backend servers.

Figure 4:
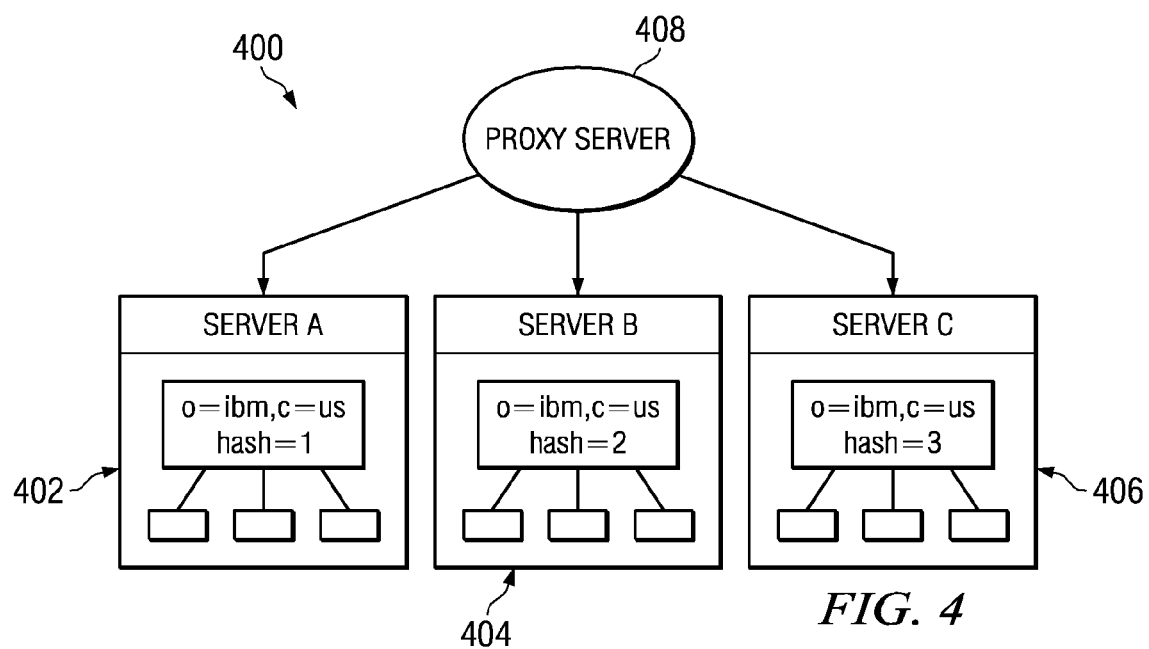
FIG. 4 illustrates a typical distributed directory configuration.

FIG. 4 illustrates a typical distributed directory configuration 400 in more detail. In this setup, three servers 402, 404 and 406 have their data split within a "container" (under some entry in the directory tree). Because the proxy server 408 handles the routing of requests to the appropriate servers, no referrals are used. Client applications need only be aware of the proxy server. The client applications never have to authenticate with servers A, B, or C. Typically, data is split evenly across the directories by hashing on the RDN just below the base of the split. In this example, the data within the subtree is split based on the hash value of the RDN. Hashing is only supported on the RDN at one level in the tree under a container. Nested partitions are allowed. In the case of a compound RDN, the entire normalized compound RDN is hashed. The hash algorithm assigns an index value to the DN of each entry. This value is then used to distribute the entries across the available servers evenly. The parent entries across multiple servers must remain synchronized. It is the administrator's responsibility to maintain the parent entries. ACLs must be defined at the partition base level on each server.

The hash value enables the proxy server to locate and retrieve entries. For example: Data under o=ibm,c=us is split across three servers. This means that the proxy server is configured to hash RDN values immediately after o=ibm, c=us among 3 servers, or "buckets." This also means that RDN values more than 1 away from o=ibm,c=us will map to the same server as values immediately after o=ibm,c=us. For example, cn=test,o=ibm,c=us and cn=user1,cn=test,o=ibm, c=us will always map to the same server. Server A 402 holds all the entries with a hash value of 1, server B 404 holds all the entries with a hash value of 2, and server C 406 holds all the entries with a hash value of 3. The proxy server receives an add request for an entry with DN cn=Test,o=ibm,c=us. The proxy server then uses the configuration information (specifically that there are 3 partitions with a base at o=ibm,c=us) and the cn=Test RDN as inputs to the internal hashing function. If the function returns 1, the entry resides on Server A 402 and the add request is forwarded there.

With the use of LDAP servers for authentication, it is important that a LDAP server support policies regarding password expiration, failed login attempts, and password rules. The proxy server provides configurable support for all three of these kinds of policies. This policy is applied to all directory entries having a given (e.g., "userPassword") attribute. The proxy server also provides a mechanism for clients to be informed of password policy related conditions (password expires in three days), and a set of operational attributes that an administrator can use to search for certain conditions, such as users with expired passwords or locked out accounts. An administrator can configure behavior of the proxy server with respect to passwords in one or more of the following areas: a global "on/off" switch for enabling or disabling password policy, rules for changing passwords, rules for password expiration, rules for password validation, rules for failed logins, and the like. Typically, the password policy settings for the directory server are stored in a named object, such as "cn=pwdpolicy" or "cn=pwdpolicy,cn=-policies".

The proxy server password policy support includes a set of LDAP controls that can be used by a password policy aware application to receive notification of additional password policy related conditions. An application can be informed of one or more warning conditions, such as: "Time remaining before password expiration," "Number of grace logins remaining after the password has expired," and the like. An application can also be informed of one or more error conditions, such as: "password has expired," "account is locked," "password has been reset and must be changed," "user is not allowed to change their password," "old password must be supplied when changing password," "new password violates syntax rules," "new password is too short," "password has been changed too recently," "new password is in history," and the like.

Preferably, two controls are used. As described above, a password policy request control is used to inform the server that the application wishes to be informed of password policy related conditions. This control must be specified by the application on all operations for which it is interested, typically an initial bind request and any password change requests. If the password policy request control is present, a password policy response control is returned by the server when any of the above error conditions are present. The proxy server may provide client APIs that can be used by C applications to work with these controls. In the alternative, LDAP directory client APIs may be used to process the controls. For example, the Java Naming and Directory Interface (JNDI) has built-in support for some well-known controls, and it also provides a framework for supporting controls that JNDI does not recognize.

FIG. 5 illustrates a representative password policy request control 500 and its corresponding response control 502.

By way of additional background, the backend directory server also maintains a set of operational attributes for each entry that has a userPassword attribute. These attributes can be searched by authorized users, either used in search filters, or returned by the search request. In a representative embodiment, these attributes include, for example: pwdChangedTime, a GeneralizedTime attribute containing the time the password was last changed; pwdAccountLockedTime, a GeneralizedTime attribute containing the time at which the account was locked; pwdExpirationWarned, a GeneralizedTime attribute containing the time at which the password expiration warning was first sent to the client; pwdFailureTime, a multi-valued GeneralizedTime attribute containing the times of previous consecutive login failures; pwdGraceUseTime, a multi-valued GeneralizedTime attribute containing the times of the previous grace logins, and pwdReset, a Boolean attribute containing the value TRUE if the password has been reset and must be changed by the user.

Password policy information is replicated by supplier servers to consumers. Changes to the named entry are replicated as global changes, like changes to the schema. Password policy state information for individual entries is also replicated, so that, for example, if an entry is locked on a supplier server, that action will be replicated to any consumers. Typically, password policy state changes on a read-only replica typically do not replicate to any other servers.

In the prior art, the proxy server does not provide password policy enforcement; in effect, such enforcement is done entirely on the backend servers. This approach is problematic for several reasons. It does not support the passing (from the backend to the client) of password policy controls to communicate warnings and extended error codes. Moreover, because user entries and target entries can reside on different backend systems, the directory cannot insure consistent policy enforcement in many circumstances. As just one example, if the proxy server round robins compare operations, it is likely that different backend servers will end up having inconsistent operational attributes. This makes it difficult for the directory to keep such attributes (e.g., failed counts, resets, or the like) up-to-date. In addition, in the prior art, external bind mechanisms bypass the bind code by performing search and compare requests that have the effect of bypassing both the proxy server and backend server password policy enforcement. The present invention addresses these and other such deficiencies.

In particular, the present invention describes a set of techniques that serve to enforce distributed password policy within a distributed directory environment such as described above. Preferably, there are three (3) distinct enhancements to the proxy server, although the present invention contemplates that any one or more of these enhancements may be implemented. In one aspect, the proxy server is enhanced to support the passing (typically from the backend server to the client) of password policy controls. In particular, controls returned from a backend server are parsed and cached (to store state information, for policy enforcement) for the life of a given client connection. According to another aspect, the proxy server ensures that all compare operations for a single user's password are directed to the same backend server in the distributed directory environment. This enhancement insures that a user's most current password is used, and that failed operation counts, resets and operational attributes are up-to-date. According to still another aspect, the proxy server enforces password policy on bind plug-ins and, in particular, using a pair of pre-bind and post-bind extended operations. In particular, pre-bind processing includes checking if an account is locked. Post-bind processing includes checking for expired passwords, grace logins and updating failed/successful bind counters.

When these policy server enhancements are used collectively, the distributed directory environment provides robust and scalable password policy enforcement. Each of these enhancements is now described in more detail.

Password Policy Control Support

According to a feature of the present invention, the proxy server is enhanced to support the passing of password policy controls. In particular, as noted above the password policy control supplies necessary information to a user about errors and warnings. An error is a condition that prevents a bind or feature operation; a warning merely is informational. The proxy server is enhanced to accept the password policy request control, preferably on all operations. When the request control is received from a client, the proxy server passes it to one of the backend servers; the proxy server then sends to the client a corresponding response control containing the errors and/or warnings that a backend server provides. Extended error and/or warning information may be provided if the client did not send the password policy request control. Where the response control is the same as would be provided by the backend server directly, the proxy server can take that control directly from the backend server and return it to the client. There are several cases, however, where the proxy server generates the response control without contacting a backend server. These are discussed in more detail below. The net result is that the client receives the same result from the proxy server as it would from a backend server that contained all the information locally (to the backend server). When a backend server receives a request without a password policy control and a password policy error or warning needs to be sent, the error or warning is returned to the proxy as additional information (preferably in a text format). If, however, a client did not send a password policy control but an error or warning needs to be returned to the client, the proxy server translates the request from a control format to provide the client such additional information. If password policy is disabled, the passing of the controls is skipped.

FIG. 6 is a process flow diagram illustrating this operation for a simple bind case.

The routine begins at step 600 when the client requests a simple bind to the proxy server. The proxy server, at step 602, routes the compare request to an appropriate one of the backend servers and sends the password policy control. At step 604, the backend directory server that receives the compare request performs pre-bind checking. A determination is then made at step 606 to determine if the account is locked. If so, the backend directory server generates a return error code at step 608. If the account is not locked, the backend directory server performs a password compare at step 610, using the post-bind password policy 612. A test is performed at step 614 to determine whether the password compare is true. If not, the routine branches back to step 608 to generate the return error code. If, however, the password compare returns true, the backend directory server generates a return success code at step 616. The return error or return success, as the case may be, is then forwarded back to the proxy server. At step 618, the proxy server parses the return code and the password policy control. The proxy server also caches this state information. At step 620, the proxy server returns the result back to the client. The client receives and parses the result at step 622 to complete the process.

Thus, in this operation, a user binds to the proxy server, which then performs a compare request for the user's password attribute, sending the password policy control. The backend server performs the pre-bind password policy checking; if the user's account is not locked and the password is correct the compare succeeds and the bind is allowed. If the compare succeeds but a warning (e.g., grace login, password must change, or the like) is returned, the proxy server returns the warning to the client. If, however, the password is invalid, the failed login count is incremented in the backend server.

When the user requests a password modify, the modify operation is performed on the backend server using a proxy authentication control. Preferably, the backend server enforces all of the password policy rules related to the modification. Thus, no special processing is needed at the proxy server for modifies.

The password policy control handling routine of the present invention is conveniently implemented as software, i.e., as a set of program code or instructions. This code may be native to the proxy server codebase or associated therewith. The code enables the proxy server to parses the response control, to cache it for re-use for the life of the client connection, and to pass the control through to the requesting client. By caching the response control, the proxy server determines whether given operations (e.g., password must change) are permitted to be performed, e.g., during a subsequent request.

The following two sections provide additional description of how the password policy control enhancement is implemented.

Honoring Password Must Change

In a common scenario, a password policy has an option configured that when a specific set of events occurs a user must change their password before they can perform any other operations. On a backend server must change is calculated at bind time; in particular, if a user must change his or her password before performing other operations, the connection is marked as must change and a warning is returned in the password policy control. As also noted above, the proxy server uses compare operations to authenticate users. When the backend server receives a compare operation for a user's password on a connection that is bound as an administrator, password must change is calculated for the target user. If must change is required, a warning is returned in the password policy control. According to the first feature as described above, the proxy server then parses the response password policy control looking for must change. If the user is required to change their password, the client connection is marked must change, and the appropriate warning is returned (by the proxy server) to the client in the password policy control. Because the proxy server is using the password policy control to gain information about password policy status, the proxy server always sends the password policy control on compare operations to the backend server, even if the requesting client did not send a password policy control. Once must change is determined for a specific client connection, only modify operations that impact the target user's password are allowed by the proxy server. The checking must happen at the proxy server level because operations could target a backend that is not aware of the users' account status. If password policy is disabled, however, this checking is skipped.

Grace Logins Not Honored

As noted above, preferably the proxy server sends the password policy control on all compare requests. In this example, the response control contains a number of grace logins left for a user and returns success if the password is valid and the account is one of the following: not locked, not expired, expired but grace logins are left. This is not a change to the password compare on a backend server. Thus, the proxy server uses the password policy control to gain information about the account status instead in lieu of an account status extended operation. This information is cached at the proxy server, as has been previously described.

Password Policy Compares Directed to a Single Write Server

As noted above, according to the second aspect of the present invention, preferably the proxy server always routes all compare requests to a single backend server, e.g., to keep the failed login count on one backend server in the distributed directory. Once again, a convenient way to implement this feature is in proxy server code.

All bind requests results in directing compare operations to the current primary write server for the target partition. According to this feature, all compare operations for a single user's password are directed to the same backend server, which insures a most current password is used and failed operation counts, reset and all operational attributes are up-to-date. If no write server is available for a partition, the proxy server targets the compare to a single read backend server for the partition. If a user requests a password compare, the proxy server also directs this compare directly to the primary write server. If the primary write server goes down, the proxy server fails over to another write server. If no write servers are available for the partition, the compare request is sent to a read only server. This ensures that users can still bind, even when all the write servers have failed.

Preferably, all compares are directed to a single read server in this case.

Supporting Bind Plug-Ins

As also noted, a further enhancement enables the proxy server to provide support for bind plug-ins in the context of password policy enforcement. Generally, a bind plug-in is a library that extends the capabilities of the proxy server or a backend directory server. It is dynamically loaded into the server's address space when started. Once the plug-in is loaded, the server calls one or more functions in a shared library by using function pointers.

In an illustrative embodiment the bind plug-in is a pre-operation plug-in, which is a plug-in that can execute a function before a directory operation is performed. A pre-operation plug-in may extend the available mechanisms that can be used to facilitate a bind operation. A pre-operation bind plug-in can be added to the proxy server, for example, to facilitate user credential validation. Such a bind plug-in has the ability to authenticate a user without ever calling into the proxy backend. (The proxy server backend should not be confused with the directory server, which is sometimes referred to herein as a backend server). This presents a unique problem in the proxy server environment because the bind plug-ins bypass the password policy code implemented in the proxy backend and therefore bypass password policy enforcement. A pre-operation bind plug-in needs the ability to access the pre- and post-bind password policy processing. On a normal backend directory server this can be done with simple API calls that directly access the RDBM backend library. On the proxy server, however, there needs to be a mechanism for the proxy server to call into the backend servers to tell the server to do pre- or post-bind processing.

Two API functions are provided for the password policy support for bind plug-ins feature. These functions call into the primary backend, preferably using two different function pointers. The proxy server adds support for these two function pointers. A first function call (e.g., _prebind_accountcheck) should be called once the DN is known and before authentication is completed. A_postbind_pwdpolicycheck function is called once authentication is determined. A_prebind_accountcheck call determines password policy access. A_postbind_pwdpolicycheck call updates the password policy counters as necessary. On an RDBM server, the API functions call into an RDBM library and perform the appropriate processing. On a proxy server, the API functions call into a proxy server backend, which makes extended operation calls to the backend servers. The following sections outline the pre- and post-bind functions behavior on a proxy server.

Remote Password Policy Extended Operations

The proxy server includes a mechanism to tell a backend server to perform password policy verification/updates both before and after a bind request. Two extended operations are implemented in the RDBM backend server; they are a Password Policy Initialize and Verify Bind Extended Operation, and a Password Policy Finalize and Verify Bind Extended Operation. Both extended operations can be enabled or disable via a setting in an LDAP configuration file, e.g., in the cn=Directory, cn=RDBM Backends, cn=Company Directory, cn=Schemas, cn=Configuration entry.

Password Policy Initialize and Verify Bind Extended Operation

This extended operation accepts a Bind DN and is performed when bound as an administrator. Preferably, the extended operation is implemented on an RDBM backend server and simply calls in to the RDBM to the pre-bind password policy code. The extended operation checks to see if the target user's account is locked. Possible return codes include codes for internal server error, the users account is locked, invalid DN or password, requestor does not have permission to perform the request, and the like.

Password Policy Finalize and Verify Bind Extended Operation

This extended operation accepts a Bind DN and return code and is performed when bound as an administrator. The extended operation is implemented on an RDBM backend server and calls in to the RDBM to the post-bind password policy code. The extended operation checks if a password is expired and if any grace logins are left. The extended operation also updates the success and failure counts/times on the entry.

Thus, the present invention provides a mechanism for the proxy server to support bind plug-ins. Pre-bind processing includes checking if an account is locked. Post-bind processing includes checking for expired passwords, grace logins and updating failed/successful bind counters.

A representative pre-operation bind plug-in may implement any convenient mechanism for validating a user's credentials where the credentials are other than merely a DN and a password. One such bind plug-in is a digest MD5 bind plug-in.

Figure 7:
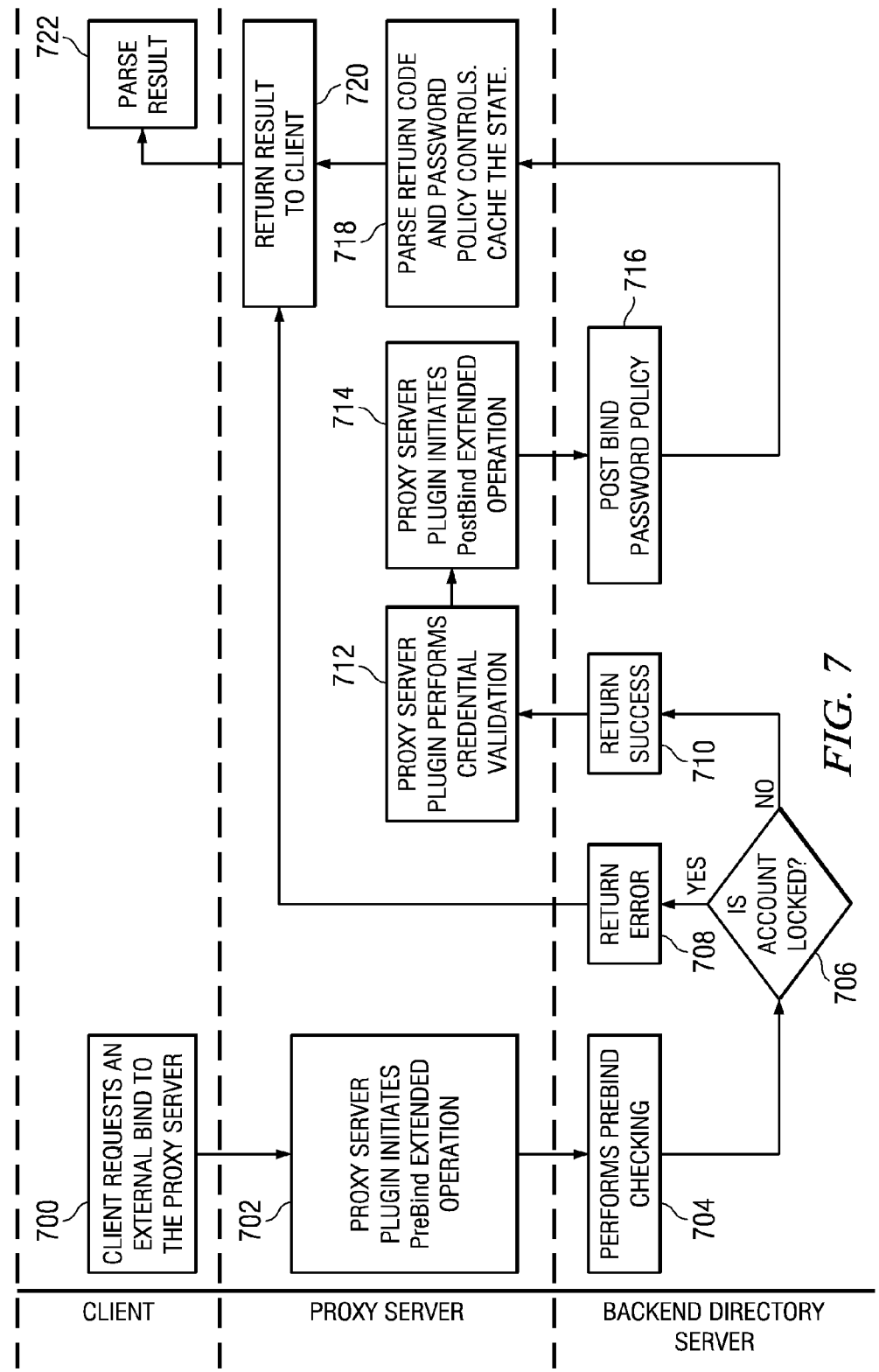
FIG. 7 is a process flow illustrating an external bind case according to the present invention.

FIG. 7 is a process flow diagram illustrating this proxy server enhancement in the context of an external bind operation.

The routine begins at step 700 when the client requests an external bind to the proxy server. The proxy server plug-in, at step 702, initiates a pre-bind extended operation and routes the request to an appropriate one of the backend servers. At step 704, the backend directory server that receives the compare request performs pre-bind checking. A determination is then made at step 706 to determine if the account is locked. If so, the backend directory server generates a return error code at step 708. If the account is not locked, the backend directory server generates a return success code 710. At step 712, the proxy server plug-in performs a credential validation. The plug-in then initiates a post-bind extended operation at step 714, using the post-bind password policy 716. At step 718, the proxy server parses the return code and the password policy control. The proxy server also caches this state information. At step 720, the proxy server returns the result back to the client. The client receives and parses the result at step 722 to complete the process.

Thus, the proxy server bind plug-in calls pre- and post-bind processing functions that, in turn, call into the backend, resulting in extending operation calls. In particular, a Password Policy Initialize and Verify Bind Extended Operation accepts a bind DN and checks to see if the target user's account is locked. The extended response value indicates if the bind request should be allowed, and any warnings are returned using the password policy control. The Password Policy Finalize and Verify Bind Extended Operation accepts a bind DN and checks if a password is expired and if any grace logins are left. The extended operation also updates the success and failure counts/times on the entry. Any warnings are returned using the password policy control. The extended response value indicates if the request processing succeeded; preferably, it does not prevent the request.

These extended operations can be used by any client application to force the proxy server to do pre- and post-bind password policy processing remotely.

The following sections provide additional details regarding the bind plug-in support.

API Functions

Two API functions are provided may be used, for example, by bind plug-in writers. Preferably, these functions are called for all bind plug-ins that handle binds. In the RDBM server, the functions simply call the _prebind_accountcheck and _postbind_pwdpolicycheck functions. In the proxy server, the functions call into the proxy server backend, which in turn makes extended operation calls into the RDBM backend.

Two API functions are provided to access and set response controls. Plug-in writers may require access to get the response controls generated from other API calls. In addition the plug-in writer may need to update the response controls in some way. The _get_response_controls and _set_response_ controls functions provide this necessary access.

Get Response Control

The _get_response_controls function returns a copy of the list of response controls. As noted above, response controls are the controls that the proxy server sends in the response to the client.

Set Response Control

The _set_response_controls function allows the caller to replace the entire list of response controls associated with a single operation.

The present invention provides several advantages.

As noted above, password policy communicates warnings and extended return codes using controls. In prior distributed directory schemes, the proxy server did not support the passing (and, in particular, from the backend server to the requesting client) of the password policy controls to communicate the warnings and extended error codes. The present invention enhances the proxy server to support the parsing, caching (for policy enforcement) and passing of such controls. In addition, the prior art proxy schemes were deficient in managing several other aspects of password policy (e.g., password must change warning, password policy lockout, inability of administrators to modify a user's password while bypassing policy rules, lack of support for extended return codes and warnings, failure to honor grace logins, inconsistent tracking of failed attempts before account locking, and the like). The present invention addresses these deficiencies as well, in part by ensuring that all compare operations for a single user's password are directed (by the proxy server) to the same backend server. This insures that a user's most current password is used, and that failed operation counts, resets and operational attributes remain up-to-date. Further, as noted above bind plug-ins present a unique challenge in a distributed directory environment. The present invention presents a series of extended operations that address the problem, to enable full support for bind plug-ins. The present invention provides the further advantage that it does not impact password policy in the backend server. In particular, password policy will work in the backend server as designed.

Preferably, all policy information is stored locally on the same backend server as the user. Thus, any policy information that applies to a specific user preferably resides on the same server as the user's entry.

The above discussion assumes a single password policy entry in the directory and that all users (except perhaps directory administrators or members of administrative groups) comply with the rules defined in this entry. It would be desirable to enable each user in the directory to have his or her individual password policy. Furthermore, to assist administrators, it would be desirable to support group password policy to enable effective password management. Thus, when it is time to decide to which set of password rules a user should adhere, all three policies, if they exist, may be taken into consideration. The following sections describe how and when these rules are determined for a given user in a multiple password polices environment. In this environment, there may be various types of password policies, including individual, group and global.

Group Password Policy

Preferably, an association between a group object and a password policy entry is supported so that the members of the group can be controlled by a set of special password rules. In an embodiment, an operational attribute (e.g., pwdGroupPolicyDN) points to a password policy entry and can be used in any user group object, such as accessgroup, accessRole, groupOfNames, groupOfUniqueNames, and the like. This approach leverages existing group-related functionalities, such as group membership determination, group referential integrity and the like, but extends the functions to support a group-related password policy.

If the DN of a directory administrator and/or the DN of a local administrator group member are specified as one of the members of a password policy group, preferably the DN is ignored. The password of a directory administrator or a member of a administrator group is governed by the administrator password policy defined in a configuration file. Because a user entry may belong to more than one group, multiple group password policy entries preferably are evaluated before the user's group policy can be determined. In a representative embodiment, attributes in all the group password policy entries are combined to form a union of attributes with the most restrictive attribute values taking precedence. How a user's composite group policy is determined is described below. An administrator may exempt a group's policy from being used in the evaluation of the composite group policy. Thus, if a user belongs to a group to which a cn=noPwdPolicy is assigned, then the user's effective policy will not include any attributes from this group policy. Other group policies as well as the global policy and the individual policy will still be evaluated Individual Password Policy According to this feature, every user is allowed to have his or her individual password policy. This feature is implemented with an operational attribute, e.g., pwdIndividualPolicyDN, which points to a password policy entry; in this way, a user entry is extended to have its own password policy entry. This named reference password policy design provides an efficient way to associate multiple user entries to the same policy entry. By changing the attributes of the password policy entry, an administrator can effectively manage a set of users without modifying any of the user entries.

It is not required that all of the password policy attributes need to be defined in a user's individual or group password policy entry. During password policy evaluation time, a user's individual group and global password policy are searched, preferably in order. If an attribute is not defined in the individual password policy entry, it will be searched in the composite group password policy entry. If the attribute is not found, an attribute in the global password policy entry will be used. In the event the attribute is not defined in the global password policy entry either, then a default value may be assumed.

By assigning a value of cn=noPwdPolicy to attribute pwdIndividualPolicyDN for a password policy extended user entry, an administrator may exempt a user from any password policy controls. This is different from not defining the attribute in the entry. If the attribute is not defined, the user's effective password policy is derived from the user's group (if it exists) and the global policy. If the attribute is defined with the special value, however, then the effective password policy is not evaluated at all, and the user is not controlled by any password rules.

Password Evaluation

Preferably, a global password policy entry is created if it does not exist when the proxy server starts up. Typically, the global password policy entry is created with an pwdPolicy attribute set to false. When the attribute is set to true the effective password policy is evaluated for a user. The evaluation of a user's password policy preferably takes place at the beginning of a connection if the bind user is not a local administrative user. Once the user's effective password policy has been determined, preferably it is stored to a local structure for the user. Preferably, this local copy is used for the life of the entire connection. After a connection is established, and depending on the type of the operation, the effective password policy of the target entry may need to be evaluated. Preferably, this effective password policy is also stored in a local structure and used by the operation.

Evaluation of a User's Group Password Policy

Because a user entry may belong to more than one group, multiple group password policy entries may be evaluated before the user's group policy is determined. The following are one or more sample rules that may be used to determine a user's composite group password policy (not all are required):

(i) attributes in all the group password policy entries are combined to form a union of attributes with the most restrictive attribute values taking precedence;

(ii) If -pwdPolicy is set to false in a password policy entry, all the attributes defined in the entry will not be used to calculate the composite group password policy; if the attribute is not set, it is defaulted to false;

(iii) if -pwdGroupPolicyDN has a value of cn=noPwdPolicy in all of the groups that a user belongs to, no composite group password is evaluated for the user. In this case, unless the user has an individual password policy defined, no policy (not even the global) is applied;

(iv) An attribute defined with a non-default value is more restrictive than if defined with a default value which, in turn, is more restrictive than if it is not defined;

(v) Some password policy attributes may be dependent on each other. Thus, for example, the value of passwordMinAlphaChars is set to less than or equal to the value in pwdMinLength minus the value in passwordMinOtherChars. If one attribute is selected from a policy, then preferably the other two attributes are also selected from the same policy. A preferred order of selection is pwdMinLength, passwordMinOtherChars, and passwordAlphaChars. Thus, in this example, the selection is based on picking a largest value for pwdMinlength. If there are two with the same value for that attribute, then the one with the largest value for passwordMinOtherChars may be selected. Once an attribute is selected, preferably the other two attributes are selected automatically. This all-or-none selection guarantees the validity of the values of a composite group password policy.

Although not meant to be limiting, FIG. 8 is a table that lists the rules among password policy attributes and one illustrative embodiment detailing an order of selection of these attributes.

FIG. 9 is a table describing how the most restrictive attribute values are determined in an illustrative embodiment.

FIG. 10 is a table showing examples of how a user's group password policy is determined using the above sample rules. In particular, the first three columns in this table identify representative group policies (for groups X, Y and Z) and how a composite group password policy results (in the fourth column) from an evaluation of the respective values in the manner described above.

Evaluation of a User's Effective Password Policy

A user's effective password policy is evaluated if -pwdPolicy is set to true in the global password policy entry. Other password policies, such as individual and group policy, may be permitted when global policy is disabled, but these policy rules preferably will have no effect on the user.

The three kinds of password policies (individual, group and global) preferably are evaluated in this order (if they exist) while evaluating a user's effective password policy. When a password policy attribute is found in any of the password policy entries, preferably the evaluation of that attribute stops and the attribute value is used as part of the user's effective policy. In this implementation, not all attributes have to be defined in a password policy. If a given attribute is not defined in one password policy, then the next password policy in order is searched until the global password policy is evaluated. If the attribute is still absent from the global policy, a default value may be assumed. As a result, preferably the final effective password policy contains all attributes that pertained to a user's password.

The attribute -pwdPolicyStartTime is set to the current system time when -pwdPolicy is turned to true. This can be done even if the global password policy entry is set to false. The -pwdPolicyStartTime values, however, preferably are not be used for effective policy evaluation unless the global policy is enabled. Once the global policy is enabled, the value of this attribute preferably is selected from a user's individual, then group, and then the global policy. Because -pwdPolicyStartTime exists in every active password policy, the start time of an individual policy, if it exists, will always override any other policy start time as the start time of the user's effective password policy.

The all-or-none attribute selection rules for selecting attributes, such as pwdMinLength, as described in the above section, preferably are also applied to a user's effective password policy evaluation.

FIG. 11 is a table showing several examples of how effective password policies are determined. In particular, each of the first three columns include respective individual, group and global password policies, and the fourth column illustrates the effective password policy that results from the evaluation of the individual, group and global policies in the manner described above.

Evaluation of a Group's Effective Password Policy

The effective password policy of a group entry preferably is calculated by merging the group's password policy attributes with those in the global password policy with the group policy attributes taking precedence. This effective policy can be queried by using an extended operation.

Interaction with other Directory components

During a bind operation, if the global password policy is enabled, the bind user's individual password policy is searched first. Then, based on the password policy group entries, the bind user's group policy can be determined once the user's group membership has been resolved. Together with the global password policy, the user's effective policy can be determined at this time. This effective policy controls if the bind user can be authenticated. Once the user is authenticated, the effective policy preferably is stored in a connection structure for later use. Preferably, the evaluation process takes place in a pre-bind process routine that can be called by the RDBM backend as well as by other bind plug-ins, such as DIGEST-MD5 pre-bind plug-in, to determine the authenticity of a user.

For any operation that is used to add or modify a password attribute including an extended operation, if the updated entry is different than the bind entry, the updated entry's effective password policy is evaluated just like the one for the bind entry, and it is stored in an RDBM request structure; otherwise, the bind entry's effective policy stored in the connection structure will be used. The effective policy is the one that decides if the password update operation is allowed.

For a modify operation modifying password attributes, such as resetting a password and unlocking a user account, if the bind user is a password administrator, no effective password policy evaluation will take place for the target user. This means a password administrator can ignore the target user's password policy when modifying password attributes associated with the above two actions. If a password administrator modifies his or her own password, however, the administrative password policy defined in the configuration file is used to make sure the passwords of the administrative users are properly modified.

In a distributed directory environment, a backend server may not be able to locate all the group entries to which a user belongs locally on the server. Without the group entries, information such as the password policy DN of a group cannot be found, and therefore, a user's effective password policy cannot be evaluated. To address this, the proxy server will send to the backend server a list of password policy DNs that apply to the user in the format of an LDAP control (e.g., a Group Password Policy DN control). In other words, for add, modify, compare and extended operations (such as effective password policy extended operation) a list of password policy DNs is expected in the request protocol from a proxy server. Based on the received password policy DNs, a backend server then is able to evaluate the effective password policy for the target user. In the alternative, the group entries reside in each backend servers to ensure the correct evaluation of a user's/group's effective password policy.

Thus, according to the above-described feature, password policy can be configured on per user, per group, or at the system wide (global) level. Multiple password policy definitions can apply to a single user, and the definitions can be distributed across different servers. Password policy evaluation cannot be done at a single server level when the data is distributed. Instead, the proxy server must work with the backend servers to determine the complete effective password policy and to enforce that policy.

As described, typically there are two required steps to password policy enforcement when multiple password policy definitions apply to a single user. The first step is to determine the effective policy. The second step is to have the effective password policy available when enforcing the policy. A third step (which is optional) reduces overhead and improves performance by minimizing the number of operations where policy information is needed for enforcement.

In the embodiment illustrated above, the proxy server collects all the policy information that applies to a given user and combines it to determine the effective password policy. To this end, the proxy server first collects the policy definitions that apply to the target user. The proxy server then collects all the policy definitions that apply to the groups to which the target user is a member. To perform this step, the proxy server performs a search for the user's entry requesting the policy attribute. A search is then done for the policy entry. The proxy server then performs a group evaluation extended operation to determine the user's group membership. It passes along a control to indicate that, in addition to group membership, each policy definition associated with the group should also be returned. This control should be sent to each partition in the distributed directory. The proxy server also collects a global level policy. Finally, the proxy server combines the policies to determine the effective password policy. This can be done by the proxy server using a local algorithm, or it can done via an extended operation to a backend server. In either case, the input would be all the policies defined (individual, group and global), and the output is the effective policy. Examples of this process are shown in FIG. 11.

Preferably, the proxy server determines the effective policy and passes the policy information to the target servers. Preferably, the policy is supplied on the operations where policy definitions are needed. The proxy server sends the effective policy information in a control on all needed operations.

Variants

In a distributed directory environment the proxy server establishes connections to the backend servers using an administrative identity. Operations are performed on behalf of the requesting client by using a proxy authorization control. When the backend servers get the proxy authorization control, they look up the password policy to determine if lockout or must change is required for the user. This means that policy information would be required for every operation. This is sometimes inefficient and can be avoided. In particular, after a bind request the proxy server has already determined if lockout or must change is required for the user. The proxy server needs a way to communicate to the backend server that password policy checking can be skipped. According to an optimization, a skip password policy control is used to communicate this with the backend servers. Preferably, only administrators are allowed to send this control, although this is not a limitation. Preferably, every operation sent to a backend server either has the skip password policy control, or the effective password policy control. Typically, the effective password policy control is needed on bind operations, on any modify operation done to a password, and on the pre- and post-bind password policy extended operations used for external binds in a distributed directory.

Another alternative is to implement partially distributed policy information. According to this feature, policy definitions are stored in a (e.g., cn=-policies) subtree that is then replicated across all servers in the system. By doing this, the step of collecting the actual policies may be avoided. Instead, the proxy server only needs to collect the policy DNs that apply to the target user. Then, the policy DNs are sent on the subsequent operations, and the evaluation and enforcement is done on the backend server.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The transform and related functions may also be implemented as a service.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions described may be combined or shared in given instructions, program sequences, code portions, and the like.

Having described our invention, what we now claim is as follows.

The invention claimed is:

1. A proxy server for use to facilitate password policy enforcement in a distributed directory that includes a set of directory servers, comprising:
   a processor;
   a pre-operation bind plug-in that executes a function in association with a directory bind operation while bypassing a password policy enforcement mechanism; and
   code executed in the processor and responsive to receipt of an external bind request from the pre-operation bind plug-in to initiate a call to a given directory server to perform a bind operation associated with a password policy.

2. The proxy server as described in claim 1 wherein the external bind request is a pre-bind operation.

3. The proxy server as described in claim 2 wherein the pre-bind operation performs a check to determine whether a user's account is locked.

4. The proxy server as described in claim 3 wherein the code executable in the processor is responsive to a response received from the given directory server for taking a given action.

5. The proxy server as described in claim 4 wherein the response indicates that the user's account is not locked and the given action is providing the pre-operation bind plug-in a response to the external bind request, wherein the response to the external bind request indicates that an authentication should proceed.

6. The proxy server as described in claim 4 wherein the response indicates that the user's account is locked and the given action is providing the pre-operation bind plug-in a response to the external bind request, wherein the response to the external bind request indicates that an authentication should not proceed.

7. The proxy server as described in claim 1 wherein the external bind request is a post-bind operation.

8. The proxy server as described in claim 7 wherein the post-bind operation performs a check to determine whether a password is expired.

9. The proxy server as described in claim 7 wherein the post-bind operation performs a check to determine whether a user's password is expired and if any grace logins are remaining for the user.

10. The proxy server as described in claim 9 wherein the post-bind operation also updates a given access count associated with the user's password.

11. The proxy server as described in claim 10 wherein the given access count is one of: a success count, and a failure count.

12. The proxy server as described in claim 7 wherein the code executable in the processor is responsive to a response received from the given directory server for taking a given action.

13. The proxy server as described in claim 12 wherein the response includes a return code and the given action is providing the pre-operation bind plug-in a response to the external bind request, wherein the response to the external bind request indicates that the external bind request succeeded.

14. The proxy server as described in claim 13 wherein the response to the external bind request is a password policy control.

15. The proxy server as described in claim 14 wherein the password policy control includes any error or warning provided by the given directory server.

16. A distributed directory, comprising:
   a set of directory servers; and
   a proxy server for enforcing at least one password policy, comprising:
      a processor;
      a bind plug-in that executes a function in association with a directory bind operation while bypassing a password policy enforcement mechanism; and
      code executed in the processor and responsive to receipt of an external bind request from the bind plug-in to initiate a call to a given directory server to perform a bind operation associated with a password policy.

17. The distributed directory as described in claim 16 wherein the external bind request is one of: a pre-bind operation, and a post-bind operation.

18. The distributed directory as described in claim 17 wherein the pre-bind operation performs a check to determine whether a user's account is locked.

19. The distributed directory as described in claim 17 wherein the post-bind operation determines if a user's password is expired and whether any grace logins remain associated with the user's account.

20. The distributed directory as described in claim 17 wherein the code executable in the processor is responsive to receipt of a response from the given directory server for providing the given bind plug-in a response to the external bind request.

21. The distributed directory as described in claim 20 wherein the response to the external bind request is a password policy control.

22. The distributed directory as described in claim 21 wherein the password policy control includes any error or warning received from the given directory server.

23. The distributed directory as described in claim 16 wherein the distributed directory is an LDAP directory.

24. A method, operative at a proxy server, for enforcing password policy within a distributed directory that includes the proxy server and a set of directory servers, and wherein the proxy server supports at least one pre-operation bind plug-in that executes a function in association with a directory bind operation while bypassing a password policy enforcement mechanism, the method comprising:

in response to receipt from the pre-operation bind plug-in of an external bind request, calling a directory server to perform a bind operation associated with a password policy;

routing the external bind request to the directory server;

receiving a response from the directory server; and forwarding the response to the pre-operation bind plug-in.

25. The method as described in claim 24 wherein the bind operation is one of: a pre-bind operation, and a post-bind operation.

26. The method as described in claim 24 wherein the pre-bind operation performs a check to determine whether a user's account is locked.

27. The method as described in claim 24 wherein the post-bind operation determines if a user's password is expired and whether any grace logins remain associated with the user's account.

28. The method as described in claim 24 wherein the response from the directory server is a password policy control.

29. The method as described in claim 28 wherein the password policy control includes any error or warning received from the directory server.

* * * * *